April 30, 1968  D. B. POYNTER  3,380,756

NOVELTY ACCESSORY FOR BICYCLES

Filed March 8, 1966  2 Sheets-Sheet 1

INVENTOR.
DONALD B. POYNTER
BY Warren Kinney Jr.
ATTORNEY.

April 30, 1968     D. B. POYNTER     3,380,756
NOVELTY ACCESSORY FOR BICYCLES
Filed March 8, 1966     2 Sheets-Sheet 2

INVENTOR.
DONALD B. POYNTER
BY J. Warren Kinney, Jr.
ATTORNEY.

3,380,756
NOVELTY ACCESSORY FOR BICYCLES
Donald Bryan Poynter, 7 Arcadia Place,
Cincinnati, Ohio 45208
Filed Mar. 8, 1966, Ser. No. 532,683
15 Claims. (Cl. 280—289)

ABSTRACT OF THE DISCLOSURE

A parachute-containing housing adapted to be mounted relative to the rear fender of a bicycle and having means operable by a rider for releasing the parachute from the housing.

---

The present invention relates to a novelty accessory or attachment for bicycles, or for similar riding vehicles.

The device comprises in general, an attractively designed housing to be mounted upon a bicycle frame behind for rear wheel fender, the housing being adapted to contain a parachute which may be released by the rider while the bicycle is in motion. Upon release of the parachute, the parachute will open behind the bicycle, giving the impression that the speed of forward motion of the bicycle is being checked or slackened in much the same manner that parachutes are employed for slackening the speed of racing cars, or of high-speed aircraft in landing upon a runway.

An object of the invention is to provide an exciting novelty accessary of the character mentioned, which, though largely inadequate for slackening the forward motion of the vehicle, will nevertheless afford the rider and onlookers a full measure of pleasurable entertainment.

Another object of the invention is to provide a device of the character stated, which is inexpensive to manufacture and simple to operate, the device being constructed also for easy attachment to all forms of modern bicycles for boys and girls.

A further object of the invention is to provide a parachute attachment of the character stated, which is durable, pleasing in appearance, and safe in operation, and which may be repeatedly restored to an inoperative condition by even the youngest of bicycle riders without skillful manipulation.

The foregoing and other objects are attained by the means described herein and illustrated upon the accompanying drawings, in which:

FIG. 3 is a front elevational view of a parachute cord anchor member, which is a part of the device.

FIG. 4 is a cross-section taken on line 4—4 of FIG. 2, showing a means of attachment to the bicycle frame.

Figure 2:
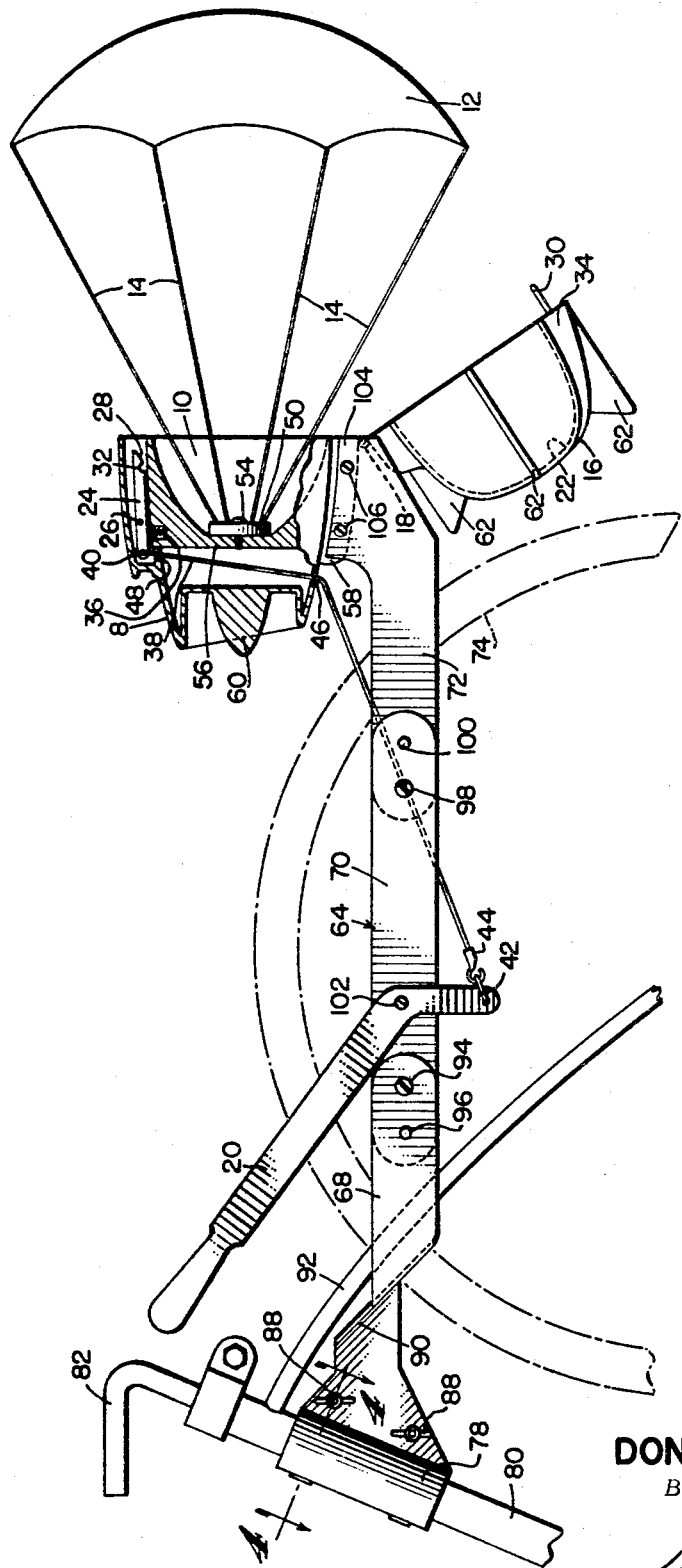
FIG. 2 is a fragmentary side elevational view, showing the parachute of the device released and extended.

The device comprises a hollow housing 8 which includes a rearwardly open chamber 10 adapted normally to contain a parachute 12 and its shroud cords 14. Chamber 10 is smoothly finished interiorly, and into it may be stuffed the major portion of the parachute, in a more or less disordered condition. A displaceable cap or door 16 may be hinged at 18 upon housing 8, so as to drop by gravity to the position of FIG. 2 when released by a rider upon manipulation of a release handle 20. The cap or door 16 is formed with a cavity 22, to accommodate that much of the parachute as will fail to enter housing chamber 10.

Figure 1:
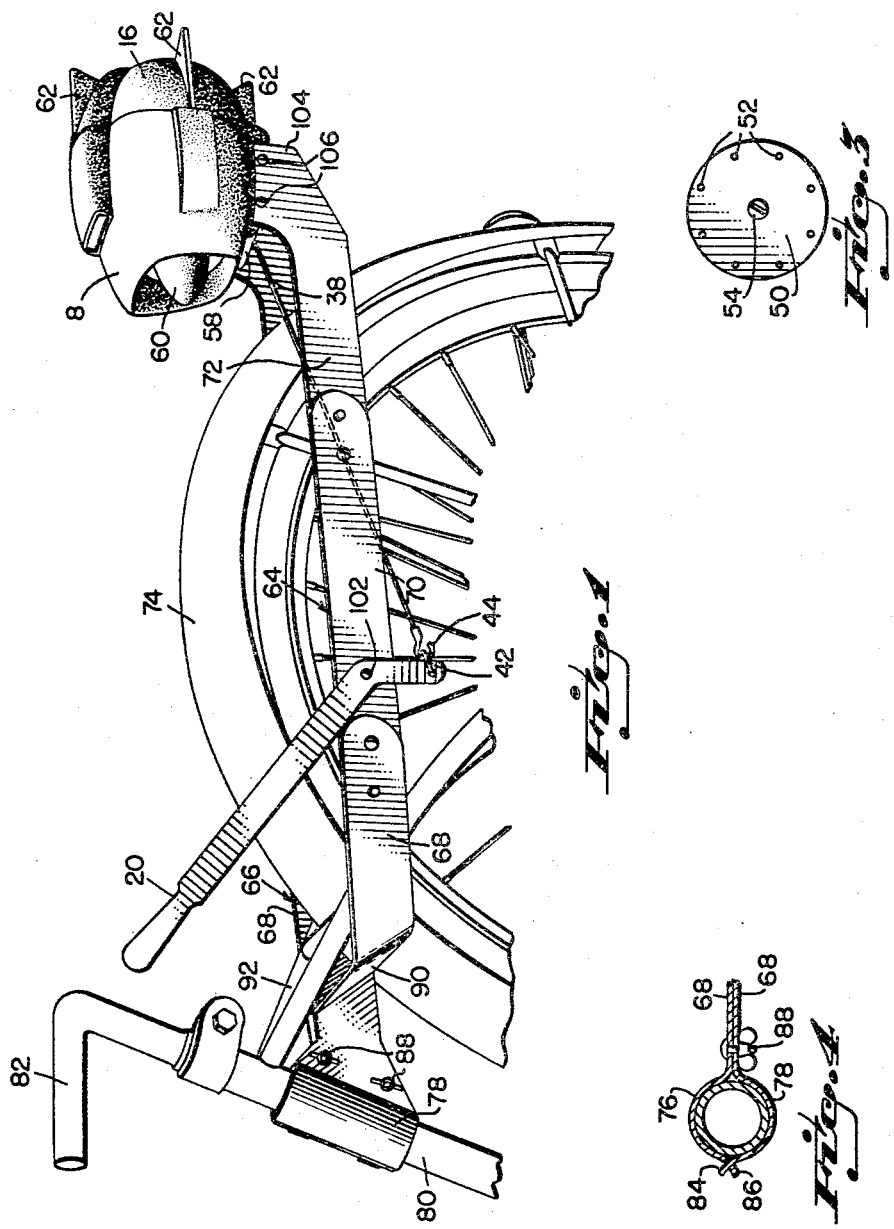
FIG. 1 is a perspective view of the device of the present invention applied to a typical bicycle, the device being shown in the normal inoperative condition.

The parachute 12 may be constructed of a fabric which resists compression, so that the inherent resiliency of the fabric tends always to spring the cap toward open position, while the parachute is in storage within chambers 10 and 22. Normally, however, the cap is latched in the closed position of FIG. 1. Under such conditions, release of latch 24 assures displacement of cap 16 and exposure of the parachute to the current of air resulting from forward motion of the vehicle, or bicycle, thereby to induce opening of the parachute behind the vehicle. A suitable material for the parachute may be nylon, rayon, or other fabric resistant to compression.

Latch 24 may be of any acceptable design, although as shown herein by way of example, it comprises a metallic flat strip hinged at 26 within housing 8, for rocking movement in a vertical plane. The latch may include an inclined nose or cam edge 28 for guiding a keeper 30 of cap 16 into a notch 32 of the latch as the cap is manually moved to closed position. Keeper 30 may be a simple wire loop having its legs embedded in a lug 34 integral with the cap. A suitable spring 36, herein shown by way of example as a coiled compression spring, may be employed to normally bias the latch in position for engaging the keeper 30. Release of the keeper may be effected by elevating the nose end of the latch, as by means of a cable 38 attached at opposite ends to latch 24 at 40, and to release handle 20 at 42. The connection at 42 may include any suitable form of separable connector 44, to facilitate installation of the device upon a bicycle. Cable 38 may pass loosely through apertures 46 and 48 in housing 8.

Parachute cords 14 may be anchored within chamber 10 in any suitable manner, although by preference, the anchorage is detachable so that any parachute suffering damage may easily be replaced. In the example shown, a parachute cord anchorage member may be in the form of a disc or plate 50 provided with a circle of apertures 52 to receive the cords 14, the cords being preferably knotted or tied at the rear face of the disc. The disc may be centrally apertured to receive an anchor screw or other fastener 54, for releasable attachment to a partition member 56 of the housing, located at the rear of chamber 10. Thus, the substitution of parachutes may quickly and easily be effected by removal of fastener 54.

Housing 8 may be provided with a lower external rib 58 extending lengthwise thereof, to serve as a mounting base for the housing, as will be explained hereinafter. The reference characters 60 and 62 indicate, respectively, decorative knobs and fins applied to the housing and to cap 16.

For mounting the parachute accessory upon a typical bicycle, there is provided a pair of spaced substantially horizontal struts 64 and 66, made preferably in sections 68, 70, 72, which struts lie at opposite sides of the rear wheel fender 74 of the bicycle, and extend rearwardly beyond the fender as shown. Strut sections 68—68 are provided with semi-cylindrical barrel portions 76 and 78 adapted to embrace the frame member 80 which supports the seat post 82 of the bicycle. Barrel portions 76 and 78 may be provided with lugs 84 and 86 which interlock upon assembly of the strut members 68—68, and the interlocking connection may be tightened by means of one or more thumb screws 88 or equivalent fasteners passing through registering openings in the strut members.

At the location 90, where the members 68—68 meet the rear wheel brace 92 of the bicycle, the strut members 68—68 each may be bent outwardly then rearwardly so as to lie at opposite sides of fender 74 in spaced substantially parallel relationship. Each strut member 68 may overlap at its terminal rear end, one of the strut members 70. At the overlap, rigid connection and alignment may be effected by means of a screw 94 and a stud 96 passing through the overlapped areas of strut members 68 and 70. In like manner, strut sections 72 may be aligned with and connected to section 70, using a screw 98 and a stud 100. As will be understood, a stud such as 100 may be fixed upon strut 70 to pass through a hole in strut 72, while screw 98 passes through registering holes in both struts. The sectional strut arrangement reduces packaging and shipment costs. The release handle 20 may be pivoted, as by means of a screw 102, upon one of the strut members 70 as shown.

Strut members 72, which are identical one with the other, may be formed each with an upwardly projected saddle portion or enlargement 104, coplanar with the strut, and provided with openings to receive screws 106. These screws may pass transversely through bores in the housing rib 58, for securing the housing rigidly between the saddle portions of the spaced parallel struts 72—72. The width of rib 58 may approximate or exceed the width of fender 74, of course.

From the foregoing, it will be appreciated that the device of the invention may be quickly and easily mounted upon a bicycle, without drilling holes or otherwise damaging the bicycle frame. Moreover, the device enhances the appearance of the bicycle, and provides much exciting fun for onlookers as well as for the rider.

In practice, the parachute is stuffed into the rear opening of chamber 10, and cap or door 16 is closed thereon to contain the parachute. Latch 24 operates automatically to engage door keeper 30 for holding the door in closed position. The cyclist, after gaining forward speed, may lift the release handle 20 to disengage latch 24-30, whereupon the parachute by reason of its inherent resiliency, will flip open the door or cap 16. Air will then enter the parachute to cause inflation thereof, and the parachute will open behind the bicycle to seemingly check the speed thereof. The size of the parachute is not necessarily calculated to actually have a material braking effect upon the speed of the bicycle since its primary purpose is to afford amusement and imaginative stimulation.

It is to be understood that various modifications and changes may be made in the structural details of the device, within the scope of the appended claims, without departing from the spirit of the invention.

What is claimed is:

1. A novelty parachute accessory for bicycles having a frame including a seat support, and a rear wheel, said accessory comprising in combination: a hollow housing supported upon the bicycle frame at a location rearwardly of the seat support, said housing having a rearwardly opening chamber; a parachute adapted for normal containment within the chamber and having shroud cords including terminal ends secured to the housing, and means accessible to a rider of the bicycle, for release of the parachute from the chamber during forward advancement of the bicycle.

2. The combination as specified by claim 1, wherein the capacity of the housing chamber is limited so as to induce a tendency of the parachute to expel itself from the open rear end of the chamber; and wherein the means last mentioned includes a displaceable door normally latched in closed position upon the chamber opening to confine the parachute within the chamber, the latch being actuatable by the rider to release the door for opening and for exposure of the parachute to an air current resulting from forward advancement of the bicycle, for inducing inflation of the parachute.

3. The combination as specified by claim 2, wherein the door is provided wtih a cavity registerable with the chamber of the housing, normally for confining a portion of the encased parachute, so that upon displacement of the door a portion of the parachute is exposed to the air current aforesaid.

4. The combination as specified by claim 3, wherein the door is hinged upon the housing for displacement with the aid of gravity, in a downwardly opening direction.

5. The combination as specified by claim 2, wherein is included a supporting structure for the housing, including means for clamping the supporting structure upon the bicycle frame member which carries the seat support.

6. The combination as specified by claim 5, wherein the supporting structure includes a pair of rearwardly extended substantially parallel struts each lying at opposite sides of the rear wheel; and means adjacent to the rear ends of the struts for attachment of the parachute housing thereto.

7. The combination as specified by claim 6, wherein the struts are formed of longitudinal sections aligned with one another at opposite sides of the wheel.

8. The combination as specified by claim 1, wherein is included a displaceable door for normally confining the parachute within the housing chamber; and wherein the means last mentioned includes a latch for holding the door in closed position upon the housing chamber, said latch being actuatable by the rider to release the door for displacement to open position.

9. The combination as specified by claim 1, wherein is removably mounted wtihin the housing chamber a shroud cord anchor member to be removed from the chamber for parachute substitution purposes.

10. A novelty parachute accessory for bicycles having a frame including a seat support member, and a rear wheel, said accessory comprising in combination: a hollow housing supported upon the bicycle frame at a location rearwardly of the seat support member, said housing having a rearwardly opening chamber; a parachute having shroud cords including terminal ends secured to the housing within the chamber thereof; a door hinged upon the housing for movement from a normally closed position covering the chamber opening, to an open position exposing the chamber opening; releasable latch means associated with the door and the housing for normally holding the door in the closed position, said latch means being releasable by the rider of the bicycle; the parachute being constructed of an inherently resilient fabric resistant to compression, and the size of the housing chamber being so limited that the parachute when stuffed into the housing chamber exerts a constant force against the door tending to flip the door to open position in opposition to the restraining action of the latch means.

11. The combination as specified by claim 10, wherein the door is provided with an interior concavity into which a portion of the parachute within the housing chamber is displaced by the inherent resiliency of the fabric of the parachute, the capacity of said concavity being limited so as to effect retention of some of the force inherent in the parachute fabric while the door is in closed position, such retained force being thereby available to flip the door open upon release of the latch means by the rider of the bicycle.

12. The combination as specified by claim 11, wherein securement of the parachute shroud cord ends to the housing is effected by the intermediary of an anchor plate carrying means for anchoring thereto the terminal ends of the cords, and means for detachably securing the anchor plate within the housing chamber for bodily removal of said plate from the chamber.

13. The combination as specified by claim 12, wherein the support for the housing upon the bicycle frame, comprises an elongate strut having a forward end secured to the bicycle frame at the seat support member, and a rear end including means for securement of the housing to said rear end of the strut, said strut extending alongside of and in substantial parallelism with the plane of the rear wheel; and a handle pivoted upon the strut, including a cable secured to the handle and to the latch means, for effecting release of the latch means upon manipulation of the handle by the rider of the bicycle.

14. The combination as specified by claim 13, wherein the strut is assembled from a plurality of elongate sections fixed to one another in substantial end to end relationship.

15. The combination as specified by claim 10, wherein the latch means is concealed within the confines of the hollow housing.

References Cited

UNITED STATES PATENTS

| | | | |
|---|---|---|---|
| 578,411 | 3/1897 | Lotherington | 280—213 |
| 582,070 | 5/1897 | Lester | 280—289 |
| 2,363,732 | 11/1944 | Jenkins | 244—113 |
| 3,233,360 | 2/1966 | Poplin | 46—86 |

OTHER REFERENCES

Playthings Magazine, December 1964, vol. 62, page 77 (copy in 46–243).

KENNETH H. BETTS, *Primary Examiner.*